United States Patent [19]

Pugnaire

[11] Patent Number: 4,545,255
[45] Date of Patent: Oct. 8, 1985

[54] LOW PRESSURE TRANSDUCER

[75] Inventor: Jean-Pierre A. Pugnaire, Arlington, Mass.

[73] Assignee: Environmental Control Technology, Inc., Bristol, Conn.

[21] Appl. No.: 571,443

[22] Filed: Jan. 17, 1984

[51] Int. Cl.⁴ .............................................. G01L 9/04
[52] U.S. Cl. ........................................ 73/726; 73/727; 338/4; 338/42
[58] Field of Search ............... 73/720, 721, 726, 727, 73/DIG. 4; 338/4, 42

[56] References Cited

U.S. PATENT DOCUMENTS

| | | | |
|---|---|---|---|
| 3,180,154 | 4/1965 | Li et al. | 73/398 |
| 3,427,885 | 2/1969 | Konigsberg | 73/398 |
| 3,520,191 | 7/1970 | Pien | 73/398 |
| 3,724,274 | 4/1973 | Millar | 338/4 |
| 3,748,623 | 7/1973 | Millar | 338/4 |
| 3,772,628 | 11/1973 | Underwood et al. | 338/4 |
| 3,884,078 | 5/1975 | Zeiringer | 73/398 |
| 3,918,019 | 11/1975 | Nunn | 338/42 |
| 4,291,293 | 9/1981 | Yamada et al. | 338/4 |

*Primary Examiner*—Donald O. Woodiel
*Attorney, Agent, or Firm*—Thomas L. Secrest; Charles B. Smith

[57] ABSTRACT

A transducer is provided for measuring very low pressures, on the order of 1.5 inches of water. A fluid-tight elastomeric barrier formed with convolutions to allow relatively large linear deflections is bonded to stiff sensing element of minimum mass, the deflection of which is sensed by strain gauges mounted on a neck connecting the sensing element to the transducer housing.

6 Claims, 5 Drawing Figures

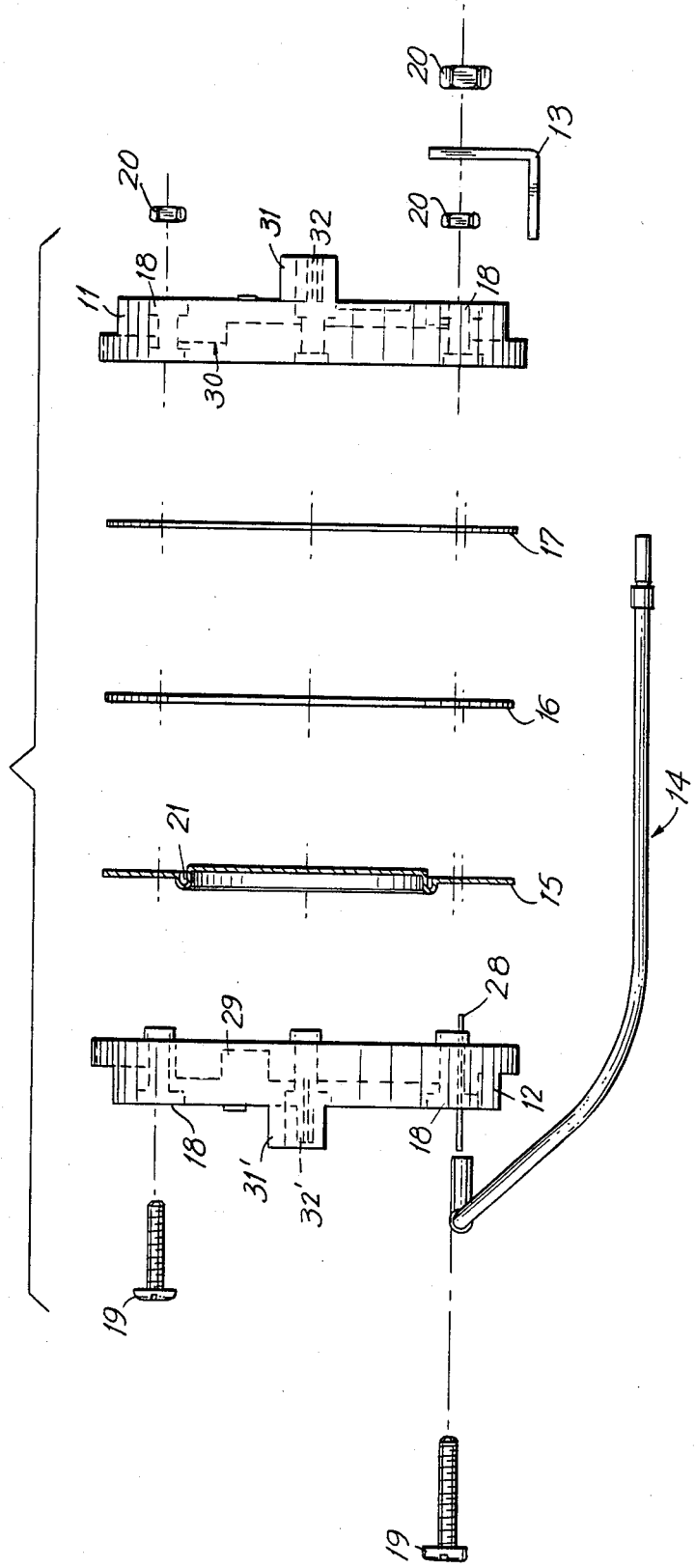

LOW PRESSURE TRANSDUCER

BACKGROUND OF THE INVENTION

This invention relates to an improved low pressure transducer that is sensitive to pressure differentials on the order of 1.5 to 5 inches of water but yet is quite rugged and inexpensive. More specifically, this invention relates to a low pressure transducer having a composite diaphragm comprised of an elastomeric barrier bonded to a stiff sensing element which serves as a backing for the elastomeric barrier and as a concentrator or collector of deflective force. The deflective force is concentrated in a narrow neck, which connects the sensing element to the transducer housing, where it is detected by strain gauges.

Prior to this invention, transducers capable of measuring very low pressures were generally fragile instruments because, at very low pressures, the energy available for transductance is very low, thus requiring a very sensitive instrument. Such fragile, sensitive instruments are difficult and expensive to build. Moreover, when working with very low pressures, the energy expended in deflecting a sensing barrier is quite high, leaving little to power the strain sensing element, and therefore giving an extremely low electrical output from the strain gauges.

SUMMARY OF THE INVENTION

The transducer of this invention comprises a composite diaphragm made up of an elastromeric barrier bonded to a stiff sensing element wherein slight deflective forces resulting from very low pressures are concentrated for measurement by strain gauges.

It is an object of this invention to provide a rugged, low cost, low pressure transducer.

Another object of this invention is to provide a low pressure transducer which avoids generation of tensile stresses and allows relatively large linear deflections of the sensing element at low pressures.

A further object of this invention is to provide a transducer in which virtually all of the strain energy is absorbed by the stiff sensing element so as to reduce the deformation of the elastomer barrier over time, thus reducing error and increasing repeatability.

BRIEF DESCRIPTION OF THE DRAWINGS

FIG. 2 is an exploded view of the elements of the transducer of this invention.

DETAILED DESCRIPTION OF THE PREFERRED EMBODIMENT OF THE INVENTION

Figure 1:
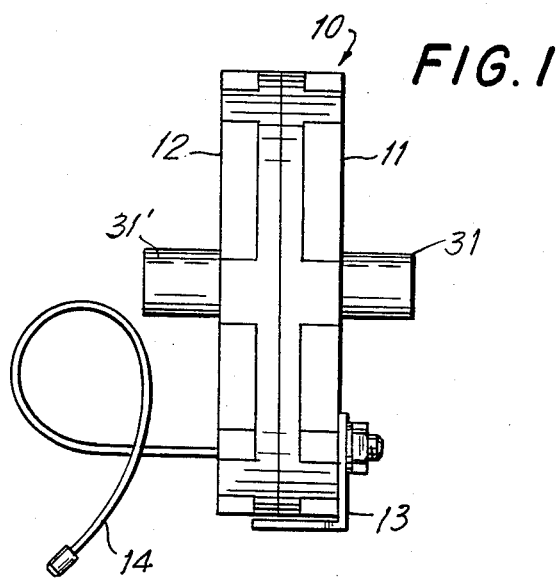
FIG. 1 is a side view of the complete transducer of this invention.

The complete transducer 10 of this invention is shown in FIGS. 1 and 2 consists of a housing in two parts, the low pressure side 11, the high pressure side 12, mounting bracket 13, and wiring harness 14. Housing elements 11 and 12 are preferably formed of molded plastic. High pressure side housing 12 is provided with overload stop 29 at the point of maximum deflection to protect the sensor from large over-pressure inputs. Likewise, low pressure side housing 11 has overload stop 30 for the same purpose. Wiring harness 14 is of a conventional design for energizing strain gauges 25 and transmitting signals from strain gauges 25 to a conventional circuit board (not shown).

Transducer housing elements 11 and 12 have fittings 31 and 31', respectively, for receiving a hose (not shown). Fittings 31 and 31' surround pipes 32 and 32' communicating with the interior of transducer 10 to connect the transducer to sources of high and low pressure, the differential of which is sensed by the transducer.

The internal elements of transducer 10 comprise elastomeric barrier 15, sensing element 16 and gasket 17. Housing elements 11 and 12 are provided with countersunk holes 18 so that the entire assembly may be joined by screws 19 and nuts 20. The internal elements of the transducer have corresponding apertures for alignment with holes 18 to allow passage therethrough of screws 19.

In assembly of the transducer, elastomeric barrier 15 and sensing element 16 are bonded together to form a composite diaphragm. Elastomeric barrier 15 is by its nature susceptible to being stretched or deformed. Therefore, the energy it absorbs can vary over time, resulting in a "creepy" sensor in which the transducer output will increase with time under constant input pressure. Bonding of elastomeric barrier 15 to a very stiff sensing element 16 results in very small energy absorption by barrier 15. Thus, the resulting creep is diminished greatly.

Figure 4:
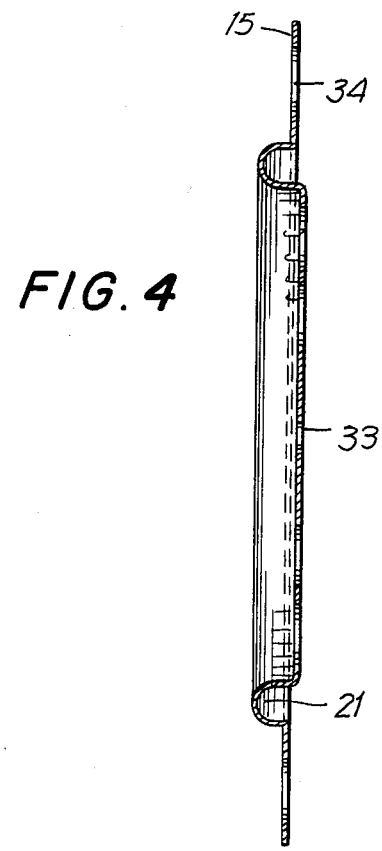
FIG. 4 is a side view of the elastomeric barrier element.
Figure 3:
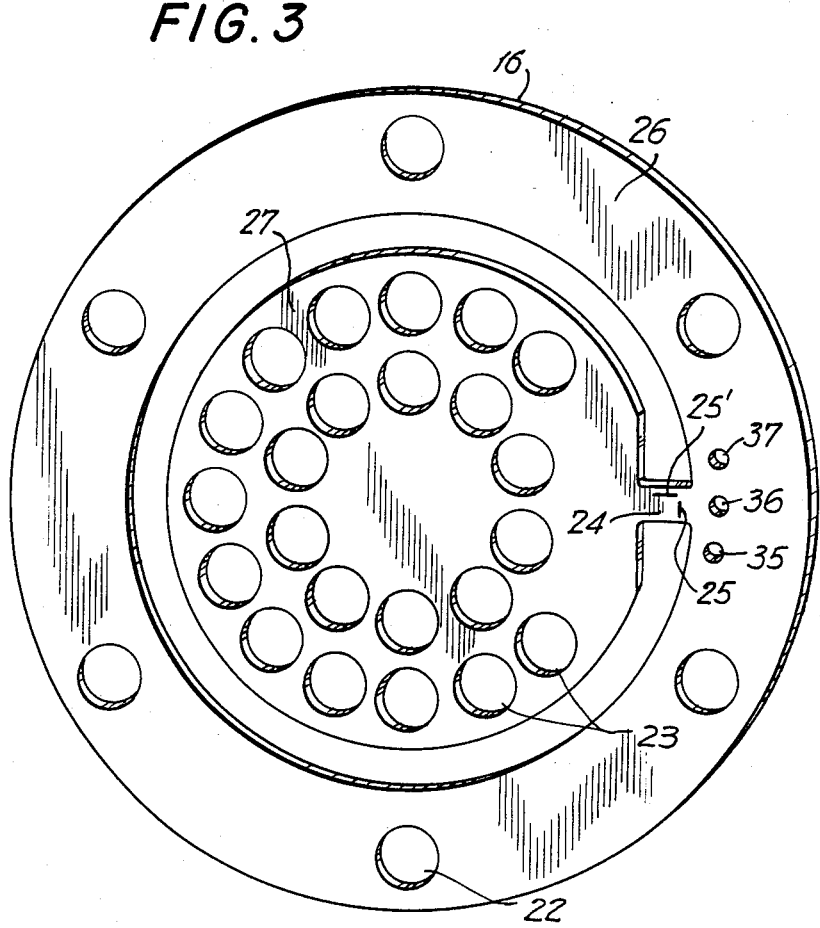
FIG. 3 is a plan view of the sensing element.

Elastomeric barrier 15 is preferably formed of silicone rubber, although other suitable elastomeric materials, such as Buna rubber, may be used. Elastomeric barrier 15 is connected around collar 34 to housing elements 11 and 12 to form a fluid tight barrier. Elastomeric barrier 15 is provided with convolution 21 (FIG. 4) which serves to prevent the generation of tensile stresses and to allow relatively large linear deflections of the barrier under low pressures. Convolution 21 is a trough-like ring formed in elastomeric barrier 15 between its sensing surface 33 and its collar 34, by which it is secured within the transducer housing. Convolution 21 allows elastomeric barrier 15 to deflect relatively large distances under small pressures without creating significant tensile forces in the elastomer itself. As can be seen (FIG. 2), the surface 33 of elastomeric barrier 15 is offset slightly toward the low pressure side of transducer 10, resulting in a slight preload that allows the transducer to measure a degree of negative pressure.

Sensing element 16 is formed of a material much stiffer than that of elastomeric barrier 15. Sensing element 16 is preferably stamped from thin plate metal, such as aluminum. Holes 22 are provided for passage of screws 19 during assembly. A plurality of holes 23 is provided to reduce the mass of sensing element 16 and so to minimize its acceleration sensitivity. As shown, sensing element 16 is formed of a single piece of metal and consists of annulus 26 and paddle 27, joined together by connecting neck 24. When element 16 is stamped from a disc of plate metal, paddle 27 is completely separated from annulus 26, except for the narrow connecting neck 24. In the assembled transducer, annulus 26 is completely stationary, being secured between housing elements 11 and 12 by screws 19 and nuts 20. Paddle 27, on the other hand, is securely bonded to elastomeric barrier 15 and consequently deflects as pressure is applied to the fluid tight barrier 15. As paddle 27 deflects, it imparts force to neck 24, which bends because at one end the neck is joined to stationary annulus 26 and at the other end it is joined to deflectable paddle 27.

Figure 5:
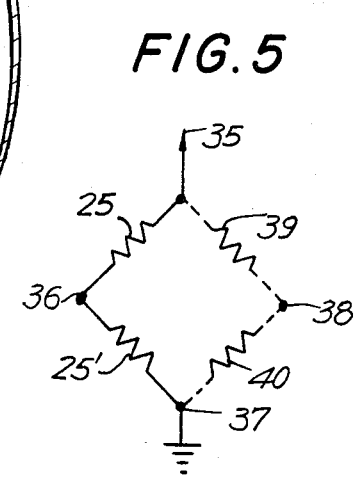
FIG. 5 is a schematic wiring diagram for strain gauges.

Paddle 27, being connected by neck 24 to stationary annulus 26, imparts strain to neck 24 as it deflects. The forces generated by deflection of barrier 15 and paddle 27 are concentrated in support neck 24 where they are detected by strain gauges 25. Strain gauges 25 are preferably of a highly doped semiconductor type, although foil strain gauges may also be used. Strain gauges 25 are connected to wiring harness 14 as schematically shown in FIG. 5. This circuitry provides a D.C. voltage to energize strain gauges 25 and also relays to wiring harness 14 the proportional voltage signals generated by strain gauges 25.

Connection 35 provides a small excitation signal, for example, +5 volts, to the lower end of strain gauge 25 by means of a thin lead welded to the surface of element 16. The upper end of gauge 25 and the right end of gauge 25' are connected by similar leads to connection 36, and the left end of gauge 25' is connected by a similar lead to the circuit common connection 37, thus completing a half Wheatstone bridge on the sensing element 16. Connections 35 and 37 are connected to a standard circuit board (not shown) having resistors 39 and 40 and output 38 to complete the Wheatstone bridge.

Strain gauges 25 and 25' are securely bonded to neck 24 by means of an insulating adhesive to avoid short circuits. The adhesive also underlies the leads between the strain gauges and connections 35, 36, and 37 for the same purpose.

Wiring harness 14 is electrically connected to strain gauges 25 and 25' at connections 35, 36, and 37. Preferably connections 35, 36, and 37 on sensing element 16 are electrically connected to wiring harness 14 by pins 28 which are molded into housing element 12, although any suitable means of electrical connection may be used.

I claim:

1. A pressure transducer for measuring pressures on the order of 1.5 to 5 inches of water comprising:
   a. a housing having integral means for transmitting electrical signals;
   b. an elastomeric barrier formed with a convolution connected at its periphery to the housing to form a fluid tight barrier;
   c. a sensing element formed of a material substantially stiffer than the material of the elastomeric barrier and comprising an annulus immovably mounted in the housing, a movable paddle bonded to the elastomeric barrier so as to deflect upon the application of pressure to the elastomeric barrier, and a narrow connecting neck joining the paddle to the annulus; and
   d. a strain gauge system located on the connecting neck and electrically connected to the integral means for transmitting electrical signals to detect deflection of the sensing element.

2. The transducer of claim 1 in which the strain gauge system comprises two strain gauges electrically connected to form a half Wheatstone bridge.

3. A pressure transducer for measuring pressures on the order of 1.5 to 5 inches of water comprising:
   a. a housing having integral means for transmitting electrical signals;
   b. an elastomeric barrier connected at its periphery to the housing to form a fluid tight barrier;
   c. a sensing element provided with a plurality of apertures and formed of a material substantially stiffer than the material of the elastomeric barrier and comprising an annulus immovably mounted in the housing, a movable paddle bonded to the elastomeric barrier so as to deflect upon the application of pressure to the elastomeric barrier, and a narrow connecting neck joining the paddle to the annulus; and
   d. a strain gauge system located on the connecting neck and electrically connected to the integral means for transmitting electrical signals to detect deflection of the sensing element.

4. A pressure transducer for measuring pressures on the order of 1.5 to 5 inches of water comprising:
   a. a housing having integral means for transmitting electrical signals;
   b. an elastomeric barrier connected at its periphery to the housing to form a fluid tight barrier and recessed in the housing to provide a slight preload to allow measurement of negative pressures;
   c. a sensing element formed of a material substantially stiffer than the material of the elastomeric barrier and comprising an annulus immovably mounted in the housing, a movable paddle bonded to the elastomeric barrier so as to deflect upon the application of pressure to the elastomeric barrier, and a narrow connecting neck joining the paddle to the annulus; and
   d. a strain gauge system located on the connecting neck and electrically connected to the integral means for transmitting electrical signals to detect deflection of the sensing element.

5. A pressure transducer for measuring pressures on the order of 1.5 to 5 inches of water comprising:
   a. a housing having integral means for transmitting electrical signals and having integral overload stops;
   b. an elastomeric barrier connected at its periphery to the housing to form a fluid tight barrier;
   c. a sensing element formed of a material substantially stiffer than the material of the elastomeric barrier and comprising an annulus immovably mounted in the housing, a movable paddle bonded to the elastomeric barrier so as to deflect upon the application of pressure to the elastomeric barrier, and a narrow connecting neck joining the paddle to the annulus; and
   d. a strain gauge system located on the connecting neck and electrically connected to the integral means for transmitting electrical signals to detect deflection of the sensing element.

6. A pressure transducer for measuring pressures on the order of 1.5 to 5 inches of water comprising:
   a. a housing having integral terminal pins and overload stops;
   b. an elastomeric barrier formed with a convolution and connected at its periphery to the housing to form a fluid-tight barrier;
   c. a sensing element formed of a material substantially stiffer than the material of the elastomeric barrier and comprising an annulus immovably mounted in the housing, a movable paddle bonded to the elastomeric barrier so as to deflect upon the application of pressure to the elastomeric barrier, and a narrow connecting neck joining the paddle to the annulus; and
   d. a strain gauge system located on the supporting neck and electrically connected to the integral terminal pins, the strain gauge system comprising two strain gauges electrically connected to form a half Wheatstone bridge.

* * * * *